United States Patent
Song (10) Patent No.: US 9,823,797 B2
(45) Date of Patent: Nov. 21, 2017

(54) TOUCH PANEL

(71) Applicant: DONGWOO FINE-CHEM CO., LTD., Iksan-si, Jeollabuk-do (KR)

(72) Inventor: Byung Hoon Song, Hwaseong-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 15/081,865

(22) Filed: Mar. 26, 2016

(65) Prior Publication Data
US 2016/0282993 A1 Sep. 29, 2016

(30) Foreign Application Priority Data

Mar. 27, 2015 (KR) .................. 10-2015-0043401
Mar. 15, 2016 (KR) .................. 10-2016-0030869

(51) Int. Cl.
G06F 3/041 (2006.01)
G06F 3/044 (2006.01)

(52) U.S. Cl.
CPC .... G06F 3/044 (2013.01); *G06F 2203/04102* (2013.01)

(58) Field of Classification Search
CPC . G06F 2203/04103; G06F 2203/04112; G06F 1/1616; G06F 1/1652; G06F 3/044; G06F 2203/04102; G06F 3/041; G06F 3/0412; G06F 1/16; G06F 2203/04111; G06F 1/1626; G06F 1/1694; G06F 2203/04104; G06F 2203/04107; G06F 3/0416; G06F 1/1618; G06F 1/1641; G06F 1/1677; G06F 3/045; H04M 1/0268; H04M 1/0266; H04M 2250/04; H04M 2250/22; H04M 1/0216; H04M 1/0247; H04M 1/72569

USPC .................................. 345/173–181
See application file for complete search history.

(56) References Cited

U.S. PATENT DOCUMENTS

| | | | | |
|---|---|---|---|---|
| 8,614,688 B2 * | 12/2013 | Chang | .................. | G06F 3/0418 345/173 |
| 2012/0262409 A1 * | 10/2012 | Tsai | ........................ | G06F 3/044 345/174 |
| 2014/0071065 A1 * | 3/2014 | Kung | ..................... | G06F 3/041 345/173 |
| 2014/0298643 A1 * | 10/2014 | Li | ........................... | G06F 3/044 29/600 |
| 2015/0241924 A1 * | 8/2015 | Chang | ..................... | G06F 3/044 349/12 |

* cited by examiner

*Primary Examiner* — Duc Dinh
(74) *Attorney, Agent, or Firm* — Maschoff Brennan (57) ABSTRACT

A touch panel includes a bending region which is at least one region which is bendable in the touch panel based on an axis; a flat region which is a region which is not bendable in the touch panel; a first unit conductive pattern formed in the flat region and configured to sense a touch; and a second unit conductive pattern formed in the bending region and configured to sense the touch. A dimension of the second unit conductive pattern is smaller than that of the first unit conductive pattern due to an opening portion formed in the second unit conductive pattern.

17 Claims, 9 Drawing Sheets

TOUCH PANEL

CROSS-REFERENCE TO RELATED APPLICATIONS

This application claims priority to and the benefit of Korean Patent Application No. 10-2015-0043401, filed on Mar. 27, 2015, and Korean Patent Application No. 10-2016-0030869, filed Mar. 15, 2016 the disclosure of which is incorporated herein by reference in its entirety.

BACKGROUND

1. Field of the Invention

Embodiments of the present invention relate to a touch panel.

2. Discussion of Related Art

Recently, a touch panel inputting in a method of touching an input device such as a finger or a stylus, etc. on an image displayed on a display device is applied to various electronic products.

The touch panels are largely classified as a touch panel of a resistive film type and a touch panel of a capacitive type. In the touch panel of the resistive film type, as a glass and an electrode are short-circuited by a pressure of an input device, a location is detected. In the touch panel of the capacitive type, a location is detected by sensing a change of a capacitance between electrodes when being touched by a finger.

Performance of the touch panel of the resistive type may be decreased by repetitive use, and a scratch may be generated on the touch panel. Accordingly, a concern on the touch panel of the capacitive type having excellent durability and a long lifecycle is being increased.

The touch panel of the capacitive type defines an effective region in which a touch command is able to be input, and an ineffective region outside the effective region. An electrode pattern formed in the effective region is formed of a transparent conductive material to transmit light from the display device.

Recently, a flexible display device which is bendable and foldable has been developed, and a bendable touch panel is required in order to implement the display device. When the touch panel is bent, there is a problem in which a crack occurs in the touch panel and thus a defect is generated in the touch panel.

Further, recently, even in a flexible display device which is able to be bent and folded, a flexible touch panel is required, and when the touch panel is bent, there is a problem in which a crack occurs in an electronic pattern and thus a defect is generated in the touch panel.

SUMMARY OF THE INVENTION

The present invention is directed to a touch panel capable of preventing a crack in a bending region.

According to an aspect of the present invention, there is provided a touch panel, including: a bending region which is at least one region which is bendable in the touch panel based on an axis; a flat region which is a region which is not bendable in the touch panel; a first unit conductive pattern formed in the flat region and configured to sense a touch; and a second unit conductive pattern formed in the bending region and configured to sense the touch, wherein a dimension of the second unit conductive pattern is smaller than that of the first unit conductive pattern due to an opening portion formed in the second unit conductive pattern.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present invention will be described in detail below with reference to the accompanying drawings. However, the spirit and scope of the present invention is not limited to the embodiments, and it should be apparent to those skilled in the art that another regressive invention or another embodiment included in the spirit and scope of the present invention is easily proposed by an addition, change, deletion, etc. of another component within the spirit and scope of the present invention and is intended to be included in the spirit and scope of the present invention.

Further, components having the same function within the same spirit and scope shown in the drawings according to embodiments will be described using the same reference numeral.

A touch panel according to one aspect includes a bending region which is at least one region which is bendable in the touch panel based on an axis; a flat region which is a region which is not bendable in the touch panel; a first unit conductive pattern formed in the flat region and configured to sense a touch; and a second unit conductive pattern formed in the bending region and configured to sense the touch, wherein a dimension of the second unit conductive pattern is smaller than that of the first unit conductive pattern due to an opening portion formed in the second unit conductive pattern.

A shape of the first unit conductive pattern may be defined by an outer boundary portion, a shape of the second unit conductive pattern may be defined by an outer boundary portion, and the first unit conductive pattern may have a shape corresponding to the second unit conductive pattern.

The second unit conductive pattern may include a plurality of divided regions divided by the opening portion.

The divided regions of the second unit conductive pattern may be connected to each other.

At least one of the plurality of divided regions of the second unit conductive pattern may be separated with another divided region of the second unit conductive pattern.

The touch panel may further include a first dummy pattern formed between adjacent unit conductive patterns including the first unit conductive pattern and the second unit conductive pattern.

The touch panel may further include a second dummy pattern formed in the opening portion.

A dimension of the first unit conductive pattern and the second unit conductive pattern may be a dimension of a region to which a conductive material is applied.

The bending region may have a radius of curvature R when the touch panel is bent, and the second unit conductive pattern may have a width of πR/10 to πR/2.

The touch panel may further include an auxiliary electrode formed on at least one of the first unit conductive pattern and the second unit conductive pattern.

The opening portion may have a broken cross shape, a curved shape, or a linear shape.

The divided regions may have dimensions different from each other.

A touch panel according to another aspect includes: a bending region which is at least one region which is bendable in the touch panel based on an axis; a flat region which is a region which is not bendable in the touch panel; a first unit conductive pattern formed in the flat region and configured to sense a touch; and a second unit conductive pattern formed in the bending region and configured to sense the touch, wherein the second unit conductive pattern has a plurality of divided regions divided by at least one opening portion, and the divided regions of the second unit conductive pattern are connected to each other.

The divided regions of the second unit conductive pattern may be connected by a plurality of connection portions.

The second unit conductive pattern may have a smaller dimension than the first unit conductive pattern.

The touch panel may further include a first dummy pattern formed between adjacent unit conductive patterns including the first unit conductive pattern and the second unit conductive pattern.

The touch panel may further include a second dummy pattern formed in the opening portion.

The bending region may have a radius of curvature R when the touch panel is bent, and the second unit conductive pattern may have a width of πR/10 to πR/2.

The touch panel may further include an auxiliary electrode formed on at least one of the first unit conductive pattern and the second unit conductive pattern.

The opening portion may have a broken cross shape, a curved shape, or a linear shape.

Hereinafter, the touch panel according to embodiments of the present invention with reference to the accompanying drawings.

Figure 1:
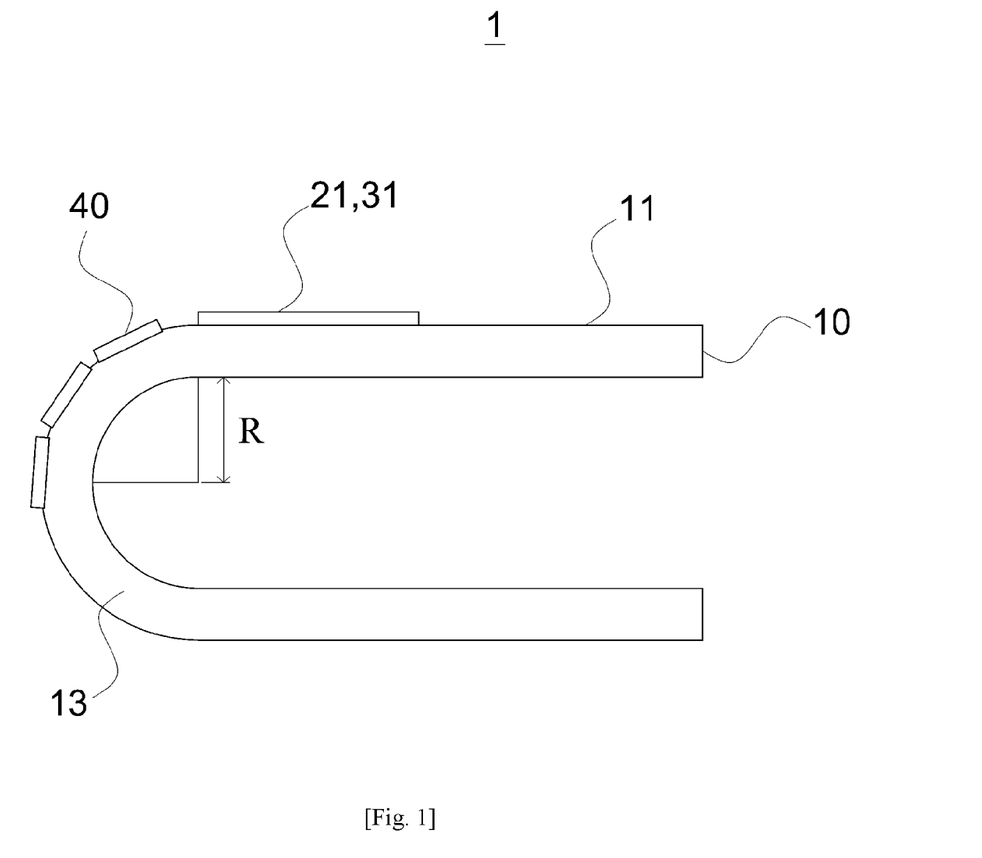
FIG. 1 is a side view for describing a touch panel according to a first embodiment of the present invention.

FIG. 1 is a side view for describing a touch panel according to a first embodiment of the present invention.

Referring to FIG. 1, a touch panel 1 according to the first embodiment of the present invention may include a substrate 10.

The substrate 10 may have a flexible structure which is able to be folded and unfolded. The substrate 10 may be folded and unfolded based on an axis. The substrate 10 may be bent based on the axis. A portion of the substrate 10 may be bent based on the axis.

Alternatively, the substrate 10 may have a bent structure.

One region which is bent in the substrate 10 may have curvature. One region which is bent in the substrate 10 may have a radius of curvature R. The center of the radius of curvature R may be the axis.

The substrate 10 may include flat regions 11, and a bending region 13. The bending region 13 may be a region which is bent based on the axis when the substrate 10 is folded, and the flat regions 11 may be regions which are not bent.

The flat regions 11 and the bending region 13 may be predetermined regions. Alternatively, the region which is bent when the substrate 10 is folded by an external force may be defined as the bending region 13, and remaining regions may be defined as the flat regions 11.

The flat regions 11 may be the regions which are flat without the curvature, and the bending region 13 may be the region having the curvature.

The flat regions 11 may be formed at both sides of the bending region 13. The flat regions 11 located at both sides of the bending region 13 may be located to face each other. The bending region 13 may be formed in a semicircular shape when viewed from the side.

An electrode pattern may be formed in the flat regions 11 and the bending region 13.

Main patterns 21 and 31 may be formed in the flat regions 11, and a bending pattern 40 may be formed in the bending region 13.

Figure 2:
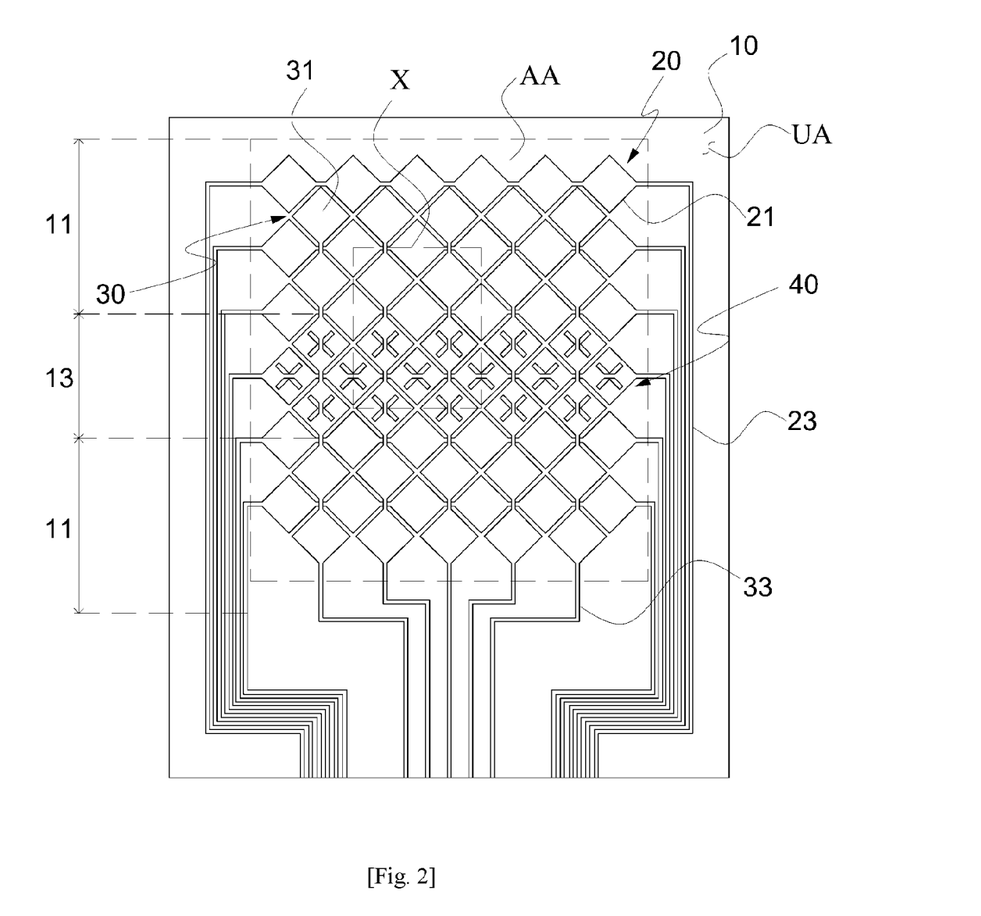
FIG. 2 is a planar view illustrating the touch panel according to the first embodiment of the present invention.
Figure 3:
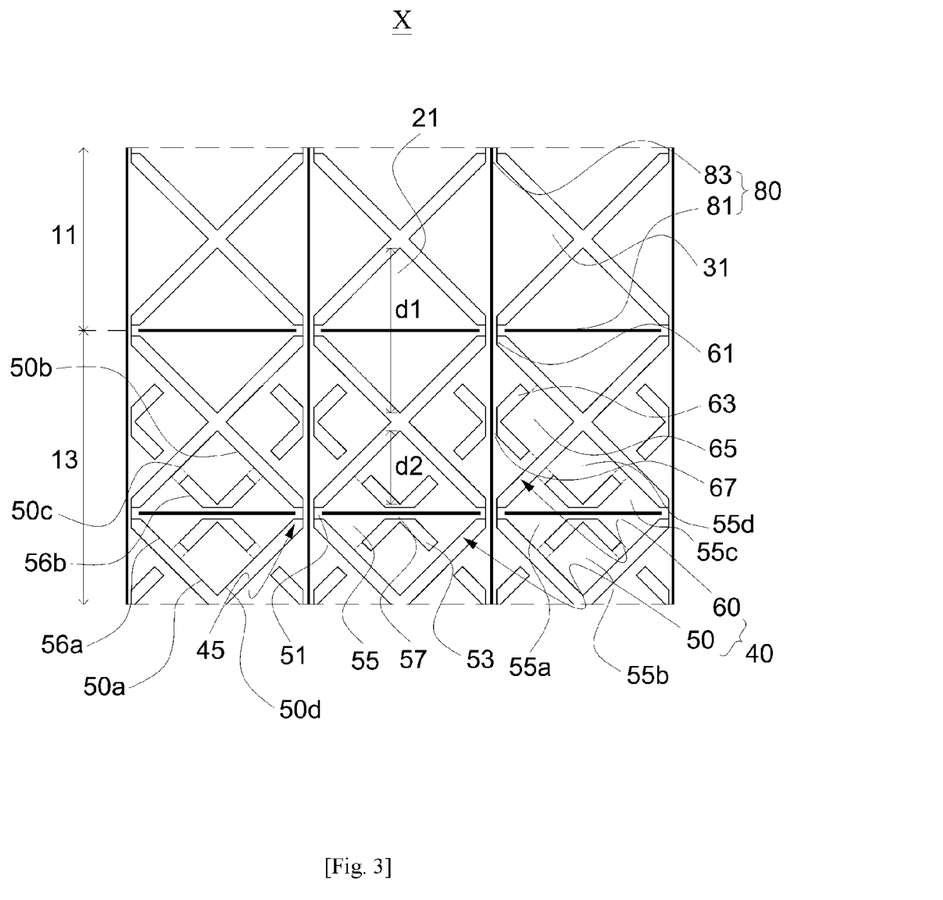
FIG. 3 is an enlarged view of a region X shown in FIG. 2.

FIG. 2 is a planar view illustrating the touch panel according to the first embodiment of the present invention, and FIG. 3 is an enlarged view of a region X shown in FIG. 2.

Referring to FIGS. 2 and 3, the touch panel 1 according to the first embodiment may include an effective region AA, and an ineffective region UA.

The touch panel 1 shown in FIG. 2 is in a planar view illustrating a state in which the bending region 13 shown in FIG. 1 is unfolded.

The effective region AA shown in FIG. 2 may refer to a region in which it is possible to input a touch command of a user, and the ineffective region UA may refer to a region in which it is not possible to input a touch command of the user since the region is deactivated even when the user touches the region.

When the touch panel 1 is attached to a display panel and used, the effective region AA and the ineffective region UA of the touch panel 1 may correspond to a display region and a non-display region of a display device. The display region may be a region which displays an image, and the non-display region may be a region which does not display an image. Accordingly, the effective region AA of the touch panel may be a region which is able to transmit light, and the ineffective region UA of the touch panel may be a region which does not transmit light.

The touch panel 1 may include the flat regions 11, and the bending region 13. The flat regions 11 may be located at both sides of the bending region 13. The bending region 13 may be located between the flat regions 11.

The main patterns 21 and 31 may be formed in the flat regions 11, and the bending pattern 40 may be formed in the bending region 13.

The main patterns 21 and 31 may include a first main pattern 21, and a second main pattern 31, and the bending pattern 40 may include a first bending pattern 50, and a second bending pattern 60 as shown in FIG. 3.

A plurality of electrode patterns may be formed in the effective region AA shown in FIG. 2. A first sensing electrode 20 and a second sensing electrode 30 may be formed in the effective region AA of the substrate 10.

The first sensing electrode 20 may include a plurality of first main patterns 21, and a plurality of first bending patterns 50, and the second sensing electrode 30 may include a plurality of second main patterns 31, and a plurality of second bending patterns 60. The plurality of first main patterns 21 and the plurality of first bending patterns 50 may be arranged in a first direction, and the plurality of second main patterns 31 and the plurality of second bending patterns 60 may be arranged in a second direction. The first direction and the second direction may be directions intersecting each other.

Each of the first main patterns 21 may be electrically connected to an adjacent first main pattern 21. Each of the second main patterns 31 may be electrically connected to an adjacent second main pattern 31. Each of the first main patterns 21 and each of the second main patterns 31 may be defined as a first unit conductive pattern. The first unit conductive pattern may be a conductive pattern capable of sensing a touch.

The first main patterns 21 and the second main patterns 31 may be formed on the flat regions 11. The first unit conductive pattern may be formed on the flat regions 11, and sense a touch.

Shapes of the first main patterns 21 and the second main patterns 31 may be defined by an outer boundary portion. The outer boundary portion may be a border between a region to which the conductive material is applied and a region to which the conductive material is not applied. A shape of the first unit conductive pattern may be defined by the outer boundary portion.

Each of the first bending patterns 50 may be electrically connected to an adjacent first bending pattern 50. Each of the second bending patterns 60 may be electrically connected to an adjacent second bending pattern 60. Each of the first bending pattern 50 and the second bending pattern may be defined as a second unit conductive pattern. A touch pixel may be configured by at least one or more second unit conductive patterns.

The first bending patterns 50 and the second bending patterns 60 may be formed on the bending region 13. The second unit conductive pattern may be formed on the bending region 13, and sense a touch.

As shown in FIG. 3, the first bending pattern 50 and the second bending pattern 60 may intersect at a crossing region 45. The first bending pattern 50 and the second bending pattern 60 may intersect at the crossing region 45 in an electrically insulated state.

A connection electrode 51 may be formed between adjacent first bending patterns 50. The connection electrode 51 may be formed in the crossing region 45. The connection electrode 51 may electrically connect the adjacent first bending patterns 50.

The first bending pattern 50, the second bending pattern 60, and the connection electrode 51 may be simultaneously formed in the same layer.

A bridge electrode 61 may be formed between adjacent second bending patterns 61. The bridge electrode 61 may be formed in the crossing region 45.

The bridge electrode 61 may electrically connect the adjacent second bending patterns 60.

The connection electrode 51 and the bridge electrode 61 may intersect each other. The connection electrode 51 and the bridge electrode 61 may intersect at the crossing region 45. The first connection electrode 51 and the bridge electrode 61 may intersect in a state of being insulated from each other. An insulating layer may be formed between the connection electrode 51 and the bridge electrode 61, and thus the connection electrode 51 and the bridge electrode 61 may be electrically separated.

A connection electrode and a bridge electrode of first main pattern 21 and second main pattern 31 may be formed in a crossing region of the first main pattern 21 and the second main pattern 31, like the bending pattern 40. Since the crossing region of the first main pattern 21 and the second main pattern 31 also has a structure similar to the crossing region of the bending patterns 40, a detailed description will be omitted.

The first bending pattern 50 may have a square shape. The first bending pattern 50 may have a rhombic shape. A shape of the first bending pattern 50 may be defined by an outer boundary portion. The outer boundary portion may be four sides of the first bending pattern 50 having the square shape.

The outer boundary portion may include a first outer boundary portion 50a, a second outer boundary portion 50b, a third outer boundary portion 50c, and a fourth outer boundary portion 50d. The first outer boundary portion 50a and the second outer boundary portion 50b may be surfaces facing each other. The third outer boundary portion 50c and the fourth outer boundary portion 50d may be surfaces facing each other. The first outer boundary portion 50a may be in contact with the third outer boundary portion 50c and the fourth outer boundary portion 50d, and the second outer boundary portion 50b may be in contact with the third outer boundary portion 50c and the fourth outer boundary portion 50d.

The first bending pattern 50 may have a shape corresponding to the first main pattern 21. The outer boundary portion of the first bending pattern 50 may have a shape corresponding to the outer boundary portion of the first main pattern 21.

A first opening region 53 may be formed in the first bending pattern 50. The first opening region 53 may be formed in a center region of the first bending pattern 50. The first opening region 53 may be formed to penetrate through the first bending pattern 50. The first opening region 53 may be formed to have an X shape by being extended in a direction of a surface facing the first bending pattern 50 having the rhombic shape. The first opening region 53 may be formed to have a broken cross shape.

The first bending pattern 50 may be formed to have a plurality of divided regions 55 by being divided by the first opening region 53. As the first bending pattern 50 is divided, four divided regions 55 may be formed. The plurality of divided regions 55 may have sizes corresponding to each other. The first bending pattern 50 may have a dimension different from the first main pattern 21 due to the first opening region 53. A region to which a conductive material is applied in the first bending pattern 50 may be decreased by a dimension of the first opening region 53, and thus the first bending pattern 50 may have a smaller dimension than the first main pattern 21. That is, a dimension of the second unit conductive pattern may be smaller than that of the first unit conductive pattern. In other words, the dimension of the second unit conductive pattern may be smaller than that of the first unit conductive pattern by the first opening region 53.

The divided region 55 may include a first divided region 55a, a second divided region 55b, a third divided region 55c, and a fourth divided region 55d.

The first divided region 55a and the third divided region 55c may be arranged along the first direction, and the second divided region 55b and the fourth divided region 55d may be arranged along the second direction. At least one divided region of the first to fourth divided regions 55a to 55d may be connected to another divided region. At least one divided region of the first to fourth divided regions 55a to 55d may be electrically connected to another divided region.

Each divided region may be connected to an adjacent divided region. The first divided region 55a may be connected to the second divided region 55b and the fourth divided region 55d, and the third divided region 55c may be connected to the second divided region 55b and the fourth divided region 55d.

Each divided region may be connected to the divided region arranged along the same direction. The first divided region 55a may be connected to the third divided region 55c. The first divided region 55a and the third divided region 55c may be electrically connected through a first connection portion 57. The first connection portion 57 may be formed by being extended along the first direction.

Although not shown, the second divided region 55b may be connected to the fourth divided region 55d.

Each divided region may be electrically connected to an adjacent divided region, and thus the first to fourth divided regions 55a to 55d may act as one unit electrode pattern.

Each divided region may have a boundary portion. The first to fourth divided regions 55a to 55d may have boundary portions.

For example, when describing the first divided region 55a of the first to fourth divided regions 55a to 55d as an example, the first divided region 55a may have a first boundary portion 56a and a second boundary portion 56b.

The first boundary portion 56a may be a boundary portion adjacent to another unit conductive pattern. The first boundary portion 56a may be a boundary portion adjacent to the adjacent unit conductive pattern. The first boundary portion 56a may be a boundary portion adjacent to the first unit conductive pattern or the second unit conductive pattern. The first boundary portion 56a may be a boundary portion adjacent to the second main pattern 31 or the second bending pattern 60. The first boundary portion 56a may be a boundary portion adjacent to the second main pattern 31 and the second bending pattern 60.

The second boundary portion 56b may be a boundary portion spaced apart from another unit conductive pattern. The second boundary portion 56b may be a boundary portion adjacent to the first opening region 53. The second boundary portion 56b may be a boundary portion adjacent to another divided region. The second boundary portion 56b may be a boundary portion adjacent to the second divided region 55b or the third divided region 55c. The second boundary portion 56b may be a boundary portion adjacent to the second divided region 55b and the third divided region 55c.

An outer boundary portion of the first bending pattern 50 may be a line connecting the first boundary portions of the divided regions. That is, the first outer boundary portion 50a of the first bending pattern 50 may be a line connecting the first boundary portion 56a of the first divided region 55a and the first boundary portion of the second divided region 55b. The second outer boundary portion 50b of the first bending pattern 50 may be a line connecting the first boundary portion of the third divided region 55c and the first boundary portion of the fourth divided region 55d. The third outer boundary portion 50c of the first bending pattern 50 may be a line connecting the first boundary portion 56a of the first divided region 55a and the first boundary portion of the fourth divided region 55d. The fourth outer boundary portion 50d of the first bending pattern 50 may be a line connecting the first boundary portion of the second divided region 55b and the first boundary portion of the third divided region 55c.

The second bending pattern 60 may have a square shape. The second bending pattern 60 may have a rhombic shape. A second opening region 63 may be formed in the second bending pattern 60. The second opening region 63 may be formed in a center region of the second bending pattern 60. The second opening region 63 may be formed to penetrate through the second bending pattern 60. The second opening region 63 may be formed to have an X shape by being extended in a direction of a surface facing the second bending pattern 60 having the rhombic shape. The second opening region 63 may be formed to have a broken cross shape.

The second bending pattern 60 may be configured with a plurality of divided regions 65 by being divided by the second opening region 63. As the second bending pattern 60 is divided, and four divided regions 65 may be formed. The divided regions 65 may have sizes corresponding to each other. The second bending pattern 60 may have a dimension different from the second main pattern 31 due to the second opening region 63. A region to which a conductive material is applied in the second bending pattern 60 may be decreased by a dimension of the second opening region 63, and thus the second bending pattern 60 may have a smaller dimension than the second main pattern 31. That is, the dimension of the second unit conductive pattern may be smaller than that of the first unit conductive pattern. In other words, the dimension of the second unit conductive pattern may be smaller than that of the first unit conductive pattern due to the opening region.

The plurality of divided regions 65 divided in one second bending pattern 60 may be electrically connected to an adjacent divided region 65. The plurality of divided regions 65 may be electrically connected through a second connection portion 67. The second connection portion 67 may be formed by being extended in the second direction.

Each divided region may be electrically connected to an adjacent divided region, and act as one unit conductive pattern.

Since a connection of the outer boundary portion, the boundary portion of the divided region, and the divided region of the second bending pattern 60 correspond to that of the first bending pattern 50, a detailed description will be omitted.

The first and second main patterns 21 and 31, and the bending pattern 40 may be formed to have widths different from each other. The widths of the first and second main patterns 21 and 31, and the bending pattern 40 may be defined as a diagonal length of a rhombic shape. The divided region of the first main patterns 21 and 31 may be formed to have a first width d1, and the divided region of the bending pattern 40 may be formed to have a second width d2. That is, a width of the first unit conductive pattern may be defined as the first width d1, and a width of the second unit conductive pattern may be defined as the second width d2.

The second width d2 may be smaller than the first width d1. The second width d2 may be a value which is half of the first width d1. As the second width d2 may be formed to be smaller than the first width d1, a crack of the bending pattern 40 capable of occurring in the bending region 13 may be prevented. That is, there may be a problem in which a tension acts on an opposite region of the substrate 10 of the bending pattern 40 by the curvature and thus a crack occurs in the bending pattern 40 formed in the bending region 13, but a crack occurring in the bending pattern 40 may be prevented by forming the second width d2 of the bending pattern 40 to be smaller than the first width d1.

Since a crack of the bending pattern 40 is prevented and the bending pattern 40 is prevented from being electrically open due to the crack, and a defect of the touch panel 1 occurring in the bending region 13 may be prevented.

When the radius of curvature of the bending region 13 of the substrate 10 is defined as R, the second width d2 may have a value of $\pi R/10$ to $\pi R/2$.

When forming the second width d2 to have a size which is greater than $\pi R/2$, since the tension applied to an outer surface of the bending pattern 40 is not decreased by the curvature, a crack may occur in the bending pattern 40 may occur, and thus a defect in the touch panel 1 may occur.

Also, when forming the second width d2 to have a size which is smaller than $\pi R/10$, a level of difficulty of a process may be increased, a manufacturing yield may be decreased, and a manufacturing cost may be increased.

Further, when the number of the divided regions 55 and the number of the divided regions 65 of the bending pattern 40 are identical and only the second width d2 is decreased, a region in which the divided regions 55 and 65 are not formed may be increased in the bending region 13, and the bending pattern 40 may be visually recognized from the outside by a difference of refractive index or reflectivity according to whether there is a pattern or not.

Moreover, when the second widths d2 of the divided regions 55 and 65 of the bending pattern 40 are decreased and the number of the divided regions 55 and 65 of the bending pattern 40 is increased by the decreased second width d2, since a width of a connection portion between the divided regions 55 and 65 of the bending pattern 40 is decreased, a crack may occur and the defect of the touch panel 1 may be generated.

Referring to FIG. 2 again, a plurality of wiring patterns may be formed in the ineffective region UA. A plurality of first wiring patterns 23 and a plurality of second wiring patterns 33 may be formed in the ineffective region UA of the substrate 10.

The first sensing electrode 20 may be electrically connected to the first wiring pattern 23. The first sensing electrode 20 may be formed to be integrated with the first wiring pattern 23, or the first sensing electrode 20 may be formed to be separated from the first wiring pattern 23.

The second sensing electrode 30 may be electrically connected to the second wiring pattern 33. The second sensing electrode 30 may be formed to be integrated with the second wiring pattern 33, or the second sensing electrode 30 may be formed to be separated from the second wiring pattern 33.

The first and second sensing electrodes 20 and 30, and the first and second wiring patterns 23 and 33 may include a conductive material. The first and second sensing electrodes 20 and 30 may be formed of a transparent conductive material. The first and second sensing electrodes 20 and 30 may include at least one conductive material selected among a group consisting of an indium tin oxide (ITO), an indium zinc oxide (IZO), a copper oxide, a carbon nano tube (CNT), a metal mesh, an argentum (Ag) nano wire, 3,4-ethylenedioxythiophene (PEDOT: polystyrene sulfonate (PSS)), and a nano fiber.

A plurality of auxiliary electrodes 80 may be formed on the first and second sensing electrodes 20 and 30 as shown in FIG. 3.

The auxiliary electrodes 80 may include a first auxiliary electrode 81, a second auxiliary electrode 83, and a third auxiliary electrode 85.

The first auxiliary electrode 81 may be formed on the first sensing electrode 20. The first auxiliary electrode 81 may be formed on the first main pattern 21 and the first bending pattern 50. The first auxiliary electrode 81 may be formed along the first direction which is an arrangement direction of the first main pattern 21 and the first bending pattern 50. The first auxiliary electrode 81 may be formed in center regions of the first main pattern 21 and the first bending pattern 50.

The first auxiliary electrode 81 may be electrically connected to the first sensing electrode 20. The first auxiliary electrode 81 may be formed to be electrically separated from the second auxiliary electrode 83. A resistance of the first sensing electrode 20 may be decreased when the first sensing electrode 20 serves as a moving path of a charge by forming the first auxiliary electrode 81 on the first sensing electrode 20. As the resistance of the first sensing electrode 20 is decreased, an RC delay is decreased, and a response speed is improved and touch sensitivity is increased since a distortion of a signal is prevented.

As the first auxiliary electrode 81 is formed on the first bending pattern 50, the first auxiliary electrode 81 may serve as an auxiliary moving path of a charge even when a crack occurs in the first bending pattern 50, and thus a defect in the touch panel 1 may be prevented. Further, as the first auxiliary electrode 81 is formed on the first bending pattern 50, a crack generated by the tension applied to an upper surface of the first bending pattern 50 may be prevented.

The second auxiliary electrode 83 may be formed on the second sensing electrode 30. The second auxiliary electrode 83 may be formed on the second main pattern 31, the second bending pattern 60, and the bridge electrode 61. The second auxiliary electrode 83 may be formed along the second direction which is the arrangement direction of the second main pattern 31 and the second bending pattern 60. The second auxiliary electrode 83 may be formed in center regions of the second main pattern 31, the second bending pattern 60, and the bridge electrode 61.

The second auxiliary electrode 83 may be electrically connected to the first sensing electrode 20. The second auxiliary electrode 83 may be electrically connected to the second main pattern 31, the second bending pattern 60, and the bridge electrode 61. The second auxiliary electrode 83 formed on the second main pattern 31, the second bending pattern 60, and the bridge electrode 61 may be integrally formed. The second auxiliary electrode 83 may be formed to be electrically separated from the first auxiliary electrode 81.

A resistance of the second sensing electrode 30 may be decreased when the second sensing electrode 30 serving as a moving path of a charge by forming the second auxiliary electrode 83 on the second sensing electrode 30. As the resistance of the second sensing electrode 30 is decreased, an RC delay may be decreased, and a response speed may be improved, and thus touch sensitivity may be increased since the distortion of a signal is prevented.

As the second auxiliary electrode 83 is formed on the second bending pattern 60, the second auxiliary electrode 83 may serve as an auxiliary moving path of a charge even when a crack occurs in the second bending pattern 60, and thus the defect in the touch panel 1 may be prevented. A crack by the tension applied to an upper surface of the second bending pattern 60 may be prevented by forming the second auxiliary electrode 83 on the second bending pattern 60. In detail, since a direction of the tension applied to the second bending pattern 60 is parallel with the arrangement direction of the second auxiliary electrode 83, the tension applied to the second bending pattern 60 may be decreased by the second auxiliary electrode 83, and thus the defect in the touch panel 1 may be prevented.

Further, although not shown, since the second main pattern 31 and the second bending pattern 60 are electrically connected through second auxiliary electrode 83, the bridge electrode 61 may be omitted. That is, since adjacent second main patterns 31 and adjacent second bending patterns 60 are electrically connected through the second auxiliary electrode 83 without the bridge electrode 61, a manufacturing cost may be reduced.

The auxiliary electrode 80 may be formed of a transparent conductive material. When the auxiliary electrode 80 includes the transparent conductive material, the auxiliary electrode 80 may include at least one conductive material selected among the group consisting of an ITO, an IZO, a copper oxide, a CNT, a metal mesh, an Ag nano wire, PEDOT:PSS, and a nano fiber.

Further, the auxiliary electrode 80 may include a low resistive metal material. When the auxiliary electrode 80 includes the low resistive metal material, the auxiliary electrode 80 may include at least one selected from the group consisting of chromium (Cr), nickel (Ni), aluminum (Al), platinum (Pt), aurum (Au), tungsten (W), copper (Cu), and molybdenum (Mo).

The auxiliary electrode 80 may be formed of the same material as the first wiring pattern 23 and the second wiring pattern 33. The auxiliary electrode 80 may be formed using the same process which forms the first wiring pattern 23 and the second wiring pattern 33. The auxiliary electrode 80 may be simultaneously formed with the first wiring pattern 23 and the second wiring pattern 33. When the auxiliary electrode 80 is simultaneously formed with the first wiring pattern 23 and the second wiring pattern 33, since a process may be simplified since a separate process of forming the auxiliary electrode 80 separately is omitted, a manufacturing cost may be decreased, and a manufacturing yield may be improved.

Table 1 represents a change of the resistance of the touch panel according to the first embodiment.

TABLE 1

| Classification | R = 3 mm | | R = 5 mm | |
| --- | --- | --- | --- | --- |
| | Resistance change | Touch operation | Resistance change | Determination |
| Conventional art | 1000% | NG | 500% | NG |
| First embodiment | 104% | OK | 102% | OK |
| First embodiment + Auxiliary electrode | 100% | OK | 100% | OK |

The conventional art according to Table 1 represents a touch panel in which a main pattern and a bending pattern are formed to have the same size in the bending region without the divided bending patterns, and the first embodiment represents a touch panel according to the first embodiment in which the auxiliary electrode was not formed. Further, a resistance test was performed on the first embodiment in which the auxiliary electrode was formed. Here, the change of the resistance was measured while being divided into a case in which the radius of curvature R was 3 mm and a case in which the radius of curvature R was 5 mm.

Referring to Table 1, in a touch panel according to the conventional art, when the radius of curvature was 3 mm, a resistance value was 1000%, and when the radius of curvature was 5 mm, the resistance value was 500%, and thus the touch panel was not normally operated.

When the radius of curvature was 3 mm, the resistance value was measured as 104% in the touch panel according to the first embodiment of the present invention in which the auxiliary electrode was not formed, and the resistance value was measured as 100% in the touch panel according to the first embodiment of the present invention in which the auxiliary electrode was formed. Accordingly, the touch panel was normally operated without a large change of the resistance value.

When the radius of curvature was 5 mm, the resistance value was measured as 102% in the touch panel according to the first embodiment of the present invention in which the auxiliary electrode was not formed, and the resistance value was measured as 100% in the touch panel according to the first embodiment of the present invention in which the auxiliary electrode was formed. Accordingly, the touch panel was normally operated without a large change of the resistance value.

That is, in the touch panel according to the first embodiment, as a small crack occurs, the resistance value may not be increased, and thus the touch panel may be normally operated. Accordingly, a defect may be prevented in the touch panels according to the first embodiment of the present invention.

Figure 4:
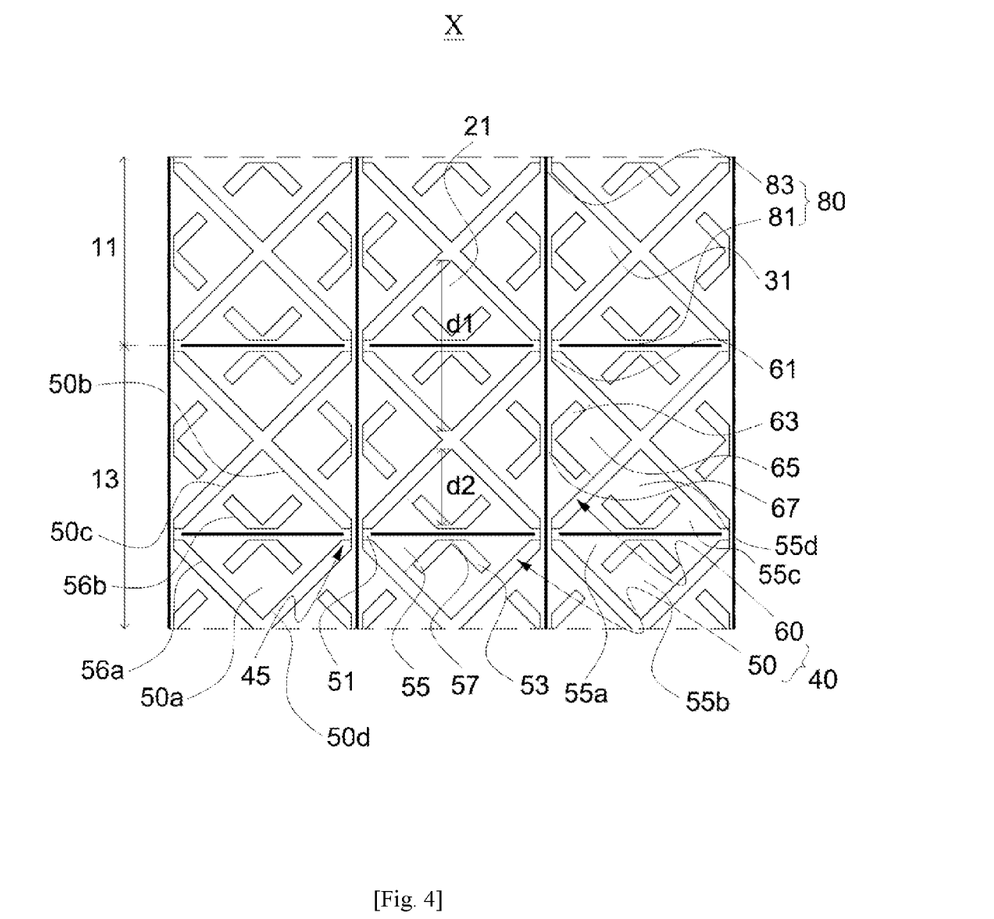
FIG. 4 is an enlarged view illustrating a touch panel according to a second embodiment of the present invention.

FIG. 4 is an enlarged view illustrating a touch panel according to a second embodiment of the present invention.

A touch panel according to the second embodiment of the present invention may have a main pattern including a first main pattern and a second main pattern formed by being divided into a plurality of divided regions compared with the first embodiment of the present invention, and the remaining elements may have the same structure. Accordingly, when describing the second embodiment of the present invention, the same reference numeral may be given to the same element as shown in the first embodiment, and a detailed description thereof will be omitted.

Referring to FIG. 4 along with FIGS. 1 and 2, as shown in FIG. 2, the first sensing electrode 20 and the second sensing electrode 30 may be formed on the substrate 10 of a touch panel 1 according to the second embodiment of the present invention.

As shown in FIGS. 2 and 4, the first sensing electrode 20 may include the plurality of first main patterns 21 and the plurality of first bending patterns 50, and the second sensing electrode 30 may include the plurality of second main patterns 31 and the plurality of second bending patterns 60.

The substrate 10 may include the flat region 11 and the bending region 13.

The first main patterns 21 and the second main patterns 31 may be formed in the flat region 11. The bending patterns 40 may be formed in the bending region 13. The bending pattern 40 may include the first bending pattern 50, and the second bending pattern 60.

The first main pattern 21 may be formed to have a shape corresponding to the first bending pattern 50. The second main pattern 31 may be formed to have a shape corresponding to the second bending pattern 60. That is, the opening region having an X shape may be also formed in the center regions of the first main pattern 21 and the second main pattern 31, and the plurality of divided regions may be formed to have a shape connected through the connection portion. The opening region may have a broken cross shape.

In this case, the divided regions of the first main pattern 21 and the second main patterns 31 may be formed to have shapes and sizes corresponding to the divided regions 55 and 65 of the first bending pattern 50 and the second bending pattern 60.

The first main pattern 21 and the second main pattern 31 may be formed to have a shape and a size corresponding to the bending pattern 40, and a difference of refractive index or reflectivity may be prevented according to a difference of sizes of the first main pattern 21 and the second main pattern 31, and the bending pattern 40. That is, since the first main pattern 21 and the second main pattern 31 have the size and shape corresponding to the bending pattern 40, the bending pattern 40 may be prevented from being visually recognized from the outside.

The first main pattern 21 and the second main pattern 31 may be defined as the first unit conductive pattern, and the bending pattern 40 may be defined as the second unit conductive pattern. The first unit conductive pattern and the second unit conductive pattern may have shapes and sizes corresponding to each other.

Since the first unit conductive pattern and the second unit conductive pattern have the shapes and the sizes corresponding to each other, every region of the touch panel 1 may selectively serve as the bending region. That is, even when an external force is applied to any region of the touch panel 1, the touch panel 1 may be bent, and when any region of the touch panel 1 is bent, the probability of a crack being generated by the divided regions of the first unit conductive pattern and the second unit conductive pattern may be decreased, and the defect of the touch panel 1 may be prevented.

Figure 5:
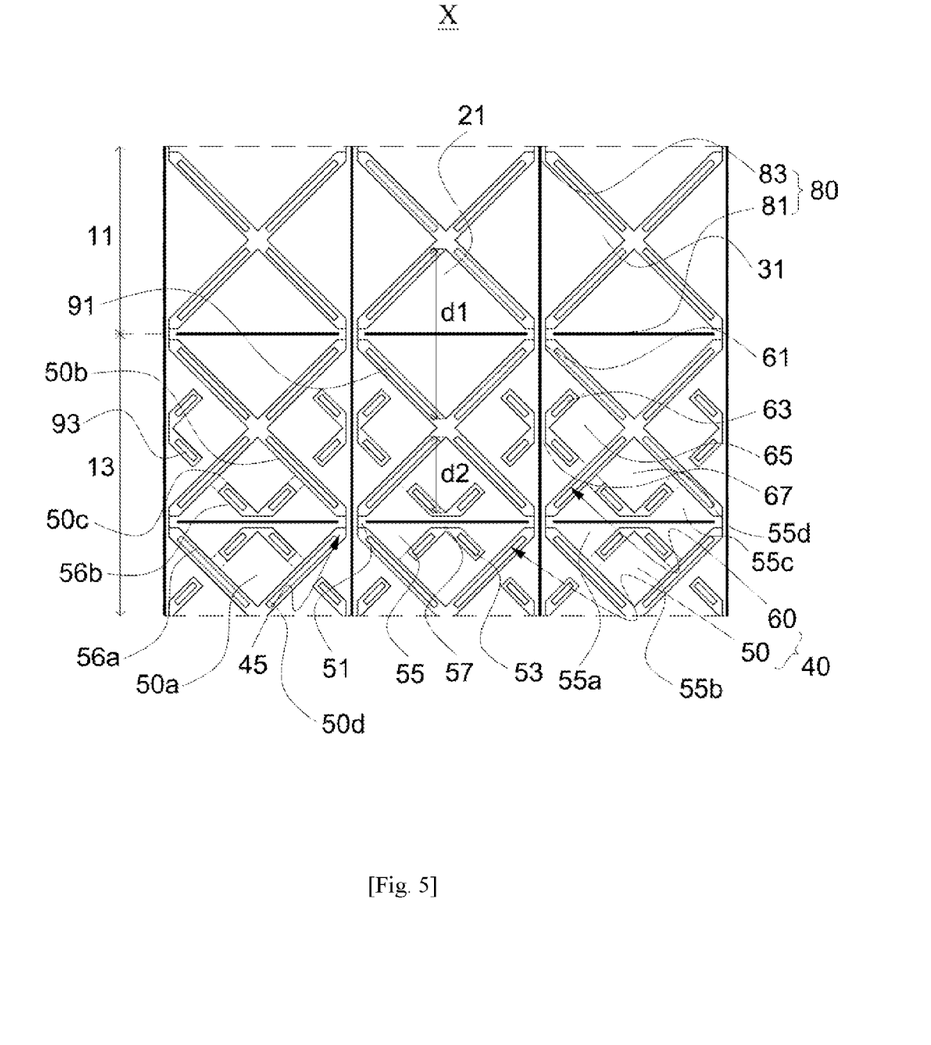
FIG. 5 is an enlarged view illustrating a touch panel according to a third embodiment of the present invention.

FIG. 5 is an enlarged view illustrating a touch panel according to a third embodiment of the present invention.

A touch panel according to the third embodiment of the present invention may have a first dummy pattern formed between the unit conductive patterns and a second dummy pattern formed in the opening region compared with the first embodiment of the present invention, and the remaining elements may have the same structure. Accordingly, when describing the third embodiment of the present invention, the same reference numeral may be given to the same element as shown in the first embodiment, and a detailed description thereof will be omitted.

Referring to FIG. 5 along with FIGS. 1 and 2, the first sensing electrode 20 and the second sensing electrode 30 may be formed on the substrate 10 of the touch panel 1 according to the third embodiment of the present invention.

As shown in FIGS. 2 and 5, the first sensing electrode 20 may include the plurality of first main patterns 21 and the plurality of first bending patterns 50, and the second sensing electrode 30 may include the plurality of second main patterns 31 and the plurality of second bending patterns 60.

The substrate 10 may include the flat region 11 and the bending region 13.

The first main patterns 21 and the second main patterns 31 may be formed in the flat region 11, and the bending patterns 40 may be formed in the bending region 13. The bending pattern 40 may include the first bending pattern 50 and the second bending pattern 60.

The first main pattern 21 and the second main pattern 31 may be defined as the first unit conductive pattern, and the bending pattern 40 may be defined as the second unit conductive pattern.

The first dummy pattern 91 may be formed between adjacent unit conductive patterns. The first dummy pattern 91 may be formed between the adjacent first unit conductive patterns, and also be formed between the adjacent second unit conductive patterns. The first dummy pattern 91 may also be formed between the first unit conductive pattern and the second unit conductive pattern. The first dummy pattern 91 may be formed between adjacent unit conductive patterns including the first unit conductive pattern and the second unit conductive pattern.

The first dummy pattern 91 may be formed between the first main pattern 21 and the second main pattern 31. The first dummy pattern 91 may be formed between the first bending pattern 50 and the second bending pattern 60. The first dummy pattern 91 may be formed between the first main pattern 21 and the second bending pattern 60. The first dummy pattern 91 may be formed between the second main pattern 31 and the first bending pattern 50.

The first dummy pattern 91 may be formed between the first sensing electrode 20 and the second sensing electrode 30.

The first dummy pattern 91 may be formed between outer boundary portions of the adjacent first unit conductive patterns. The first dummy pattern 91 may also be formed between outer boundary portions of the adjacent second unit conductive patterns. The first dummy pattern 91 may also be formed between the outer boundary portion of the first unit conductive pattern and the outer boundary portion of the second unit conductive pattern.

The first dummy pattern 91 may not be electrically connected to an adjacent unit conductive pattern. The first dummy pattern 91 may be electrically open with respect to the adjacent unit conductive pattern.

The second dummy pattern 93 may be formed in the opening region of the second unit conductive pattern.

The first opening region 53 may be formed in the first bending pattern 50. The second opening region 63 may be formed in the second bending pattern 60.

The second dummy pattern 93 may be formed in at least one of the first opening region 53 and the second opening region 63.

The second dummy pattern 93 may not be connected to the second unit conductive pattern. The second dummy pattern 93 may be electrically open with respect to the second unit conductive pattern.

In this case, a region in which a conductive material is not applied between the second dummy pattern 93 and the second unit conductive pattern may be defined as the opening region, and the second dummy pattern may be defined as one portion of the second unit conductive pattern. The second dummy pattern 93 may be defined as divided regions of the second unit conductive pattern.

When defining the second dummy pattern 93 as divided regions of the second unit conductive pattern, at least one of the divided regions of the second unit conductive pattern 93 may not be connected to the other divided regions of the second unit conductive pattern 93. At least one of the divided regions of the second unit conductive pattern 93 may be electrically open with respect to the other divided regions of the second unit conductive pattern 93.

The first dummy pattern 91 and the second dummy pattern 93 may be formed using the same material and the same process. The first dummy pattern 91 and the second dummy pattern 93 may be formed using the same material and the same process as the unit conductive pattern.

The first dummy pattern 91 and the second dummy pattern 93 may be formed of the same material as the unit conductive pattern, and compensate for a difference of transmissivity and refractive index between a region to which the conductive material is applied and a region to which the conductive material is not applied, and thus the unit conductive pattern can be prevented from being visually recognized with the naked eye. Further, the first dummy pattern 91 and the second dummy pattern 93 may be formed in the region to which the conductive material is not applied, and compensate for a low resistance value of the boundary region of the unit conductive patterns.

Figure 6:
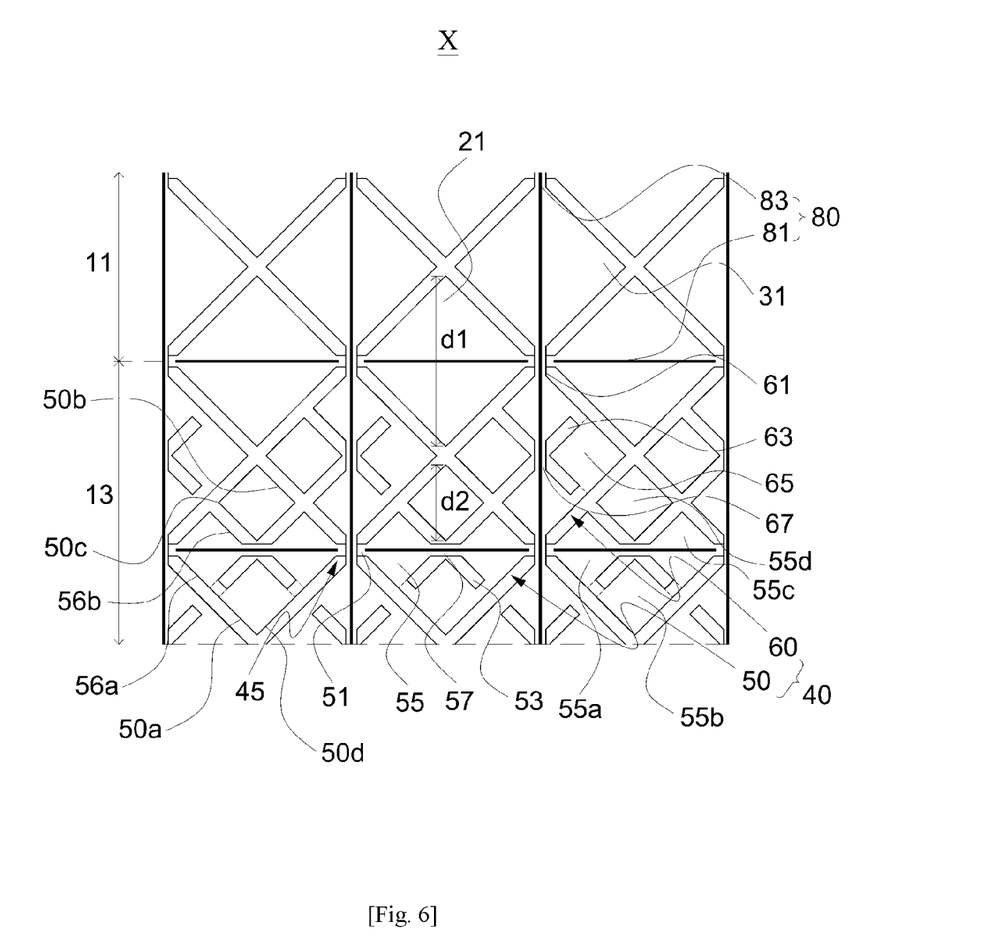
FIG. 6 is an enlarged view illustrating a touch panel according to a fourth embodiment of the present invention.

FIG. 6 is an enlarged view illustrating a touch panel according to a fourth embodiment of the present invention.

A touch panel according to the fourth embodiment of the present invention may have the second unit pattern having a different shape compared with the first embodiment of the present invention, and the remaining elements may have the same structure. Accordingly, when describing the fourth embodiment of the present invention, the same reference numeral may be given to the same element as shown in the first embodiment, and a detailed description thereof will be omitted.

Referring to FIG. 6 along with FIGS. 1 and 2, the first sensing electrode 20 and a second sensing electrode 30 may be formed on the substrate 10 of the touch panel 1 according to the fourth embodiment of the present invention.

As shown in FIGS. 2 and 6, the first sensing electrode 20 may include the plurality of first main patterns 21 and the plurality of first bending patterns 50, and the second sensing electrode 30 may include the plurality of second main patterns 31 and the plurality of second bending patterns 60.

The substrate 10 may include the flat region 11 and the bending region 13.

The first main patterns 21 and the second main patterns 31 may be formed in the flat region 11, and the bending patterns 40 may be formed in the bending region 13. The bending pattern 40 may include the first bending pattern 50 and the second bending pattern 60.

The first main pattern 21 and the second main pattern 31 may be defined as the first unit conductive pattern, and the bending pattern 40 may be defined as the second unit conductive pattern.

The first opening region 53 may be formed in the first bending pattern 50. The plurality of divided regions 55 may be defined by the first opening region 53. At least one of the plurality of divided regions 55 may not be electrically connected to an adjacent divided region. At least one of the plurality of divided regions 55 may be electrically open with respect to the adjacent divided region. The divided region which is electrically open with respect to the adjacent divided region of the plurality of divided regions 55 may act as the dummy pattern. At least one of the plurality of divided regions 55 may be separated with the adjacent divided region.

The divided region 55 may include a first divided region 55*a*, a second divided region 55*b*, a third divided region 55*c*, and a fourth divided region 55*d*.

The first divided region 55*a* may be connected to the second divided region 55*b*, and the first divided region 55*a* may be connected to the third divided region 55*c*. The first divided region 55*a* and the third divided region 55*c* may be connected by the first connection portion 57.

The second divided region 55*b* may be connected to the first divided region 55*a*, and the second divided region 55*b* may be connected to the third divided region 55*c*.

The fourth divided region 55*d* may be electrically open with respect to an adjacent divided region, and act as the dummy pattern.

The fourth divided region 55*d* may be formed using the same material and the same process as another divided region. Since the fourth divided region 55*d* is formed using the same material as another divided region, a difference of transmissivity and refractive index may be compensated for, and thus the unit conductive pattern can be prevented from being visually recognized with the naked eye.

Figure 7:
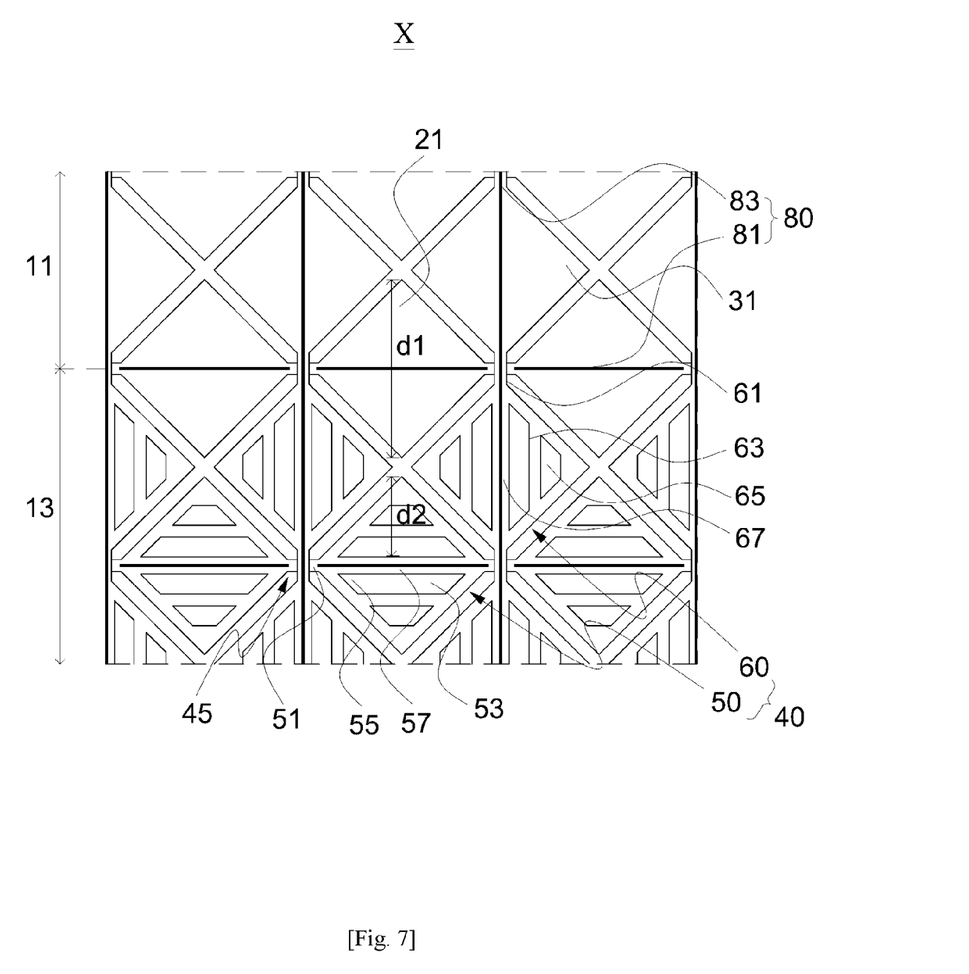
FIGS. 7 and 8 are enlarged views illustrating a touch panel according to another embodiment of the present invention.
Figure 8:
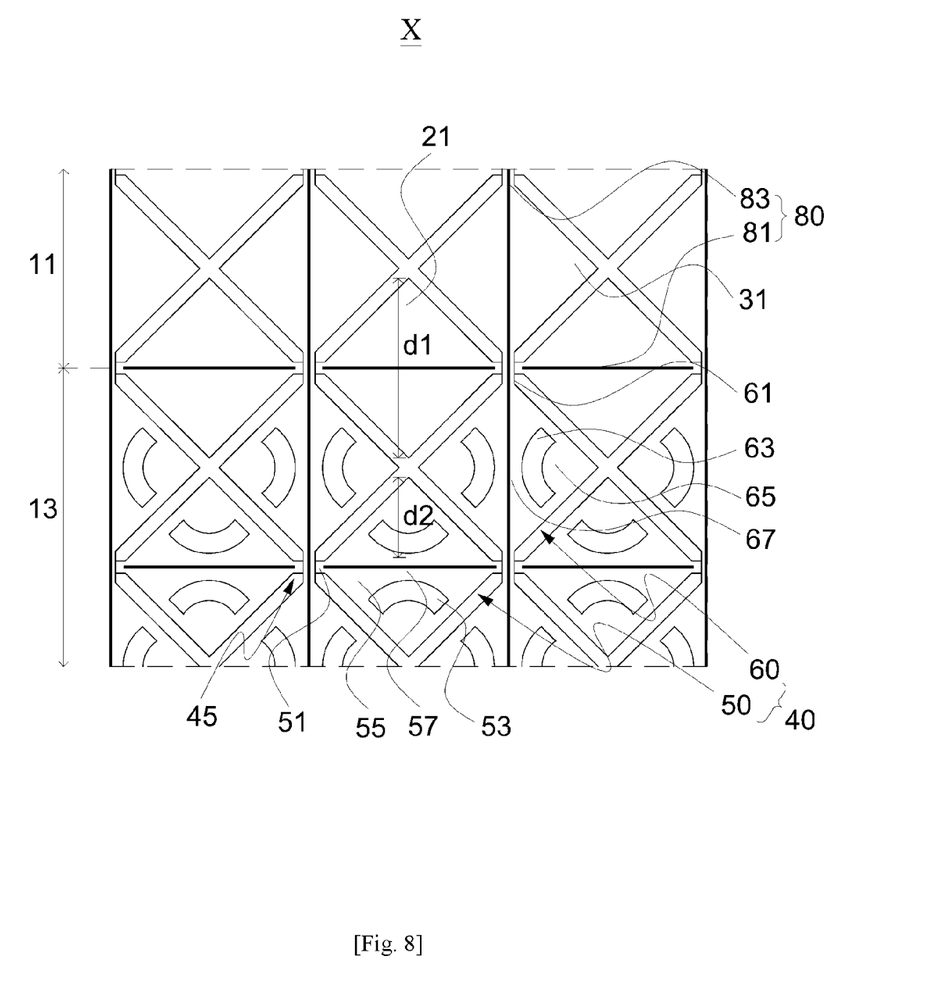

FIGS. 7 and 8 are enlarged views illustrating a touch panel according to another embodiment of the present invention.

A touch panel according to another embodiment of the present invention may have the same structure excluding that the opening region is different compared with the first embodiment of the present invention. Accordingly, when describing another embodiment of the present invention shown in FIGS. 7 and 8, the same reference numeral may be given to the same element as shown in the first embodiment, and a detailed description thereof will be omitted.

The first opening region 53 may be formed in the first bending pattern 50 shown in FIG. 7.

The first opening region 53 may have a linear shape. The first opening region 53 may have a plurality of linear shapes which are parallel to each other. The first opening region 53 may have a linear shape extended in the same direction as a direction in which the first bending pattern 50 is arranged. The first opening region 53 may have a linear shape extended in the first direction. The first opening region 53 may be formed in a direction perpendicular to a direction of a tension occurring when the touch panel 1 is bent.

As the first opening region 53 is formed in the direction perpendicular to the direction of the tension occurring when the touch panel 1 is bent, the tension applied to the first bending pattern 50 may be removed by the first opening region 53, and thus a crack of the first bending pattern 50 may be prevented.

The second opening region 63 may be also formed in the second bending pattern 60. The second opening region 63 may have a linear shape extended along the second direction. The second opening region 63 may have the linear shape extended in a direction perpendicular to the first opening region 53.

Although not shown, the second opening region 63 may have the linear shape extended in a direction parallel to the first opening region 53.

The first opening region 53 having a curved shape may be formed in the first bending pattern 50 shown in FIG. 8. The first opening region 53 having a plurality of curved shapes may be formed in the first bending pattern 50.

The second opening region 63 having a curved shape may be formed in the second bending pattern 60. The second opening region 63 having a plurality of curved shapes may be formed in the second bending pattern 60.

Figure 9:
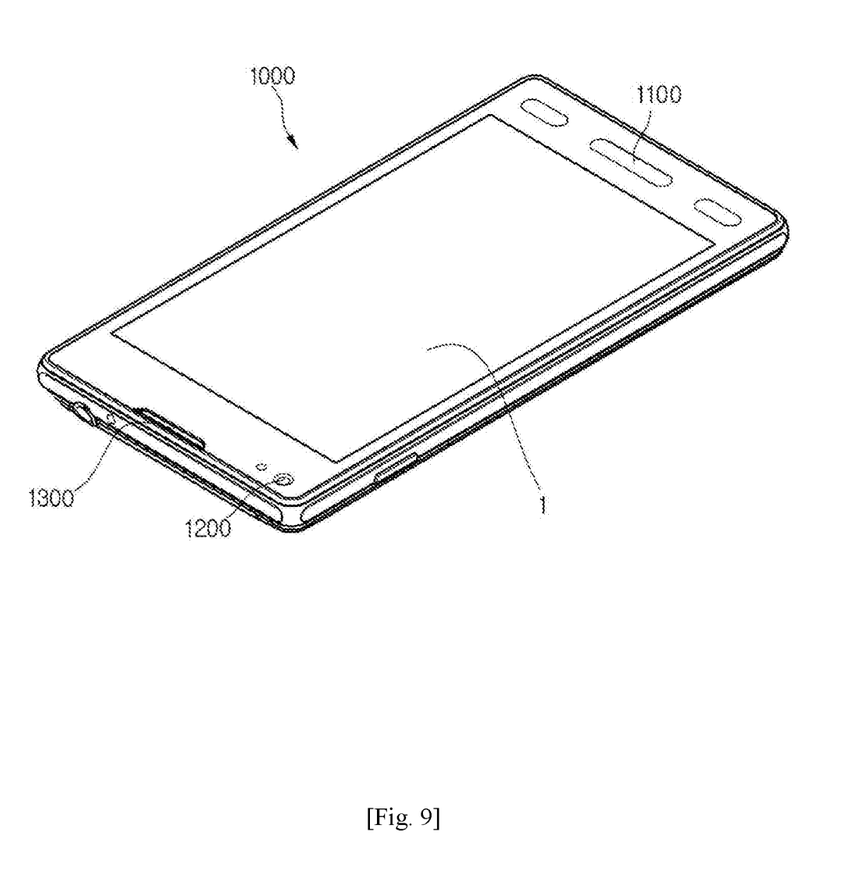
FIG. 9 is a perspective view illustrating a display device to which the touch panel is applied according to an embodiment of the present invention.

FIG. 9 is a perspective view illustrating a display device to which the touch panel is applied according to an embodiment of the present invention.

Referring to FIG. 9, an input button 1100 for inputting a command from the outside, a camera 1200 for capturing a still image and a moving image, and a speaker 1300 for outputting a sound may be formed in a display device 1000.

The display device 1000 may include the touch panel 1 described above and a display panel (not shown). The touch panel 1 may be formed on a front side of the display panel. The display panel may be attached to the touch panel 1.

The display panel may display an image. The display panel may be a liquid crystal display (LCD) panel, or an organic light emitting display (OLED) panel, and be applied to various products such as a mobile phone, a television (TV), and a navigation device, etc.

The touch panel according to embodiments of the present invention can prevent cracks by forming a pattern having the shape formed by dividing a pattern of the flat region in the bending region.

The touch panel according to embodiments of the present invention can improve visibility by forming patterns of the bending pattern and the flat region in the same shape.

While the configuration and the features of the present invention are described based on the above-described embodiments, the present invention is not limited thereto, and it should be apparent to those skilled in the art that various modifications can be made to the above-described embodiments of the present invention without departing from the spirit or scope of the invention. Thus, it is intended that the present invention covers all such modifications provided they come within the scope of the appended claims and their equivalents.

What is claimed is:

1. A touch panel, comprising:
   a bending region which is at least one region which is bendable in the touch panel based on an axis;
   a flat region which is a region which is not bendable in the touch panel;
   a first unit conductive pattern formed in the flat region and configured to sense a touch;
   a second unit conductive pattern formed in the bending region and configured to sense the touch, the second unit conductive pattern includes a plurality of divided regions divided by the opening portion, wherein a shape of a divided region is corresponding to a shape of the first unit conductive pattern and wherein the opening portion has a broken cross shape; and
   a first auxiliary electrode is formed on adjacent divided regions arranged in a first direction,
   wherein first auxiliary electrodes adjacent in the first direction are spaced apart from each other,
   wherein a dimension of the second unit conductive pattern is smaller than that of the first unit conductive pattern due to an opening portion formed in the second unit conductive pattern.

2. The touch panel of claim 1, wherein the shape of the first unit conductive pattern is defined by an outer boundary portion, a shape of the second unit conductive pattern is defined by an outer boundary portion, and the first unit conductive pattern has a shape corresponding to the second unit conductive pattern.

3. The touch panel of claim 1, wherein the divided regions of the second unit conductive pattern are connected to each other.

4. The touch panel of claim 1, wherein at least one of the plurality of divided regions of the second unit conductive pattern is separated with another divided region of the second unit conductive pattern.

5. The touch panel of claim 1, further comprising:
   a first dummy pattern formed between adjacent unit conductive patterns including the first unit conductive pattern and the second unit conductive pattern.

6. The touch panel of claim 1, further comprising:
   a second dummy pattern formed in the opening portion.

7. The touch panel of claim 1, wherein a dimension of the first unit conductive pattern and the second unit conductive pattern is a dimension of a region to which a conductive material is applied.

8. The touch panel of claim 1, wherein the bending region has a radius of curvature R when the touch panel is bent, and
   the second unit conductive pattern has a width of $\pi R/10$ to $\pi R/2$.

9. The touch panel of claim 1, further comprising:
   a second auxiliary electrode is formed on adjacent divided regions arranged in a second direction.

10. The touch panel of claim 1, wherein the divided regions have dimensions different from each other.

11. A touch panel, comprising:
    a bending region which is at least one region which is bendable in the touch panel based on an axis;
    a flat region which is a region which is not bendable in the touch panel;
    a first unit conductive pattern formed in the flat region and configured to sense a touch;
    a second unit conductive pattern formed in the bending region and configured to sense the touch, the second unit conductive pattern has a plurality of divided regions divided by at least one opening portion, wherein the divided regions of the second unit conductive pattern are connected to each other, wherein a shape of a divided region is corresponding to a shape of the first unit conductive pattern and wherein the opening portion has a broken cross shape; and
    a first auxiliary electrode is formed on adjacent divided regions arranged in a first direction,
    wherein first auxiliary electrodes adjacent in the first direction are spaced apart from each other.

12. The touch panel of claim 11, wherein the divided regions of the second unit conductive pattern are connected by a plurality of connection portions.

13. The touch panel of claim 11, wherein the second unit conductive pattern has a smaller dimension than the first unit conductive pattern.

14. The touch panel of claim 11, further comprising:
    a first dummy pattern formed between adjacent unit conductive patterns including the first unit conductive pattern and the second unit conductive pattern.

15. The touch panel of claim 11, further comprising:
    a second dummy pattern formed in the opening portion.

16. The touch panel of claim 11, wherein the bending region has a radius of curvature R when the touch panel is bent, and
    the second unit conductive pattern has a width of $\pi R/10$ to $\pi R/2$.

17. The touch panel of claim 11, further comprising:
    a second auxiliary electrode is formed on adjacent divided regions arranged in a second direction.

* * * * *